US012592732B2

(12) United States Patent
Mokhtari-Koushyar et al.

(10) Patent No.: US 12,592,732 B2
(45) Date of Patent: Mar. 31, 2026

(54) FIELD PROGRAMMABLE OPTICAL FILTER

(71) Applicant: ORCA Computing Limited, London (GB)

(72) Inventors: Farzad Mokhtari-Koushyar, Austin, TX (US); Thien-An Nguyen, Austin, TX (US); Che-Chun Lin, Austin, TX (US)

(73) Assignee: ORCA Computing Limited, London (GB)

( * ) Notice: Subject to any disclaimer, the term of this patent is extended or adjusted under 35 U.S.C. 154(b) by 265 days.

(21) Appl. No.: 18/488,709

(22) Filed: Oct. 17, 2023

(65) Prior Publication Data

US 2024/0128992 A1     Apr. 18, 2024

Related U.S. Application Data

(60) Provisional application No. 63/416,742, filed on Oct. 17, 2022.

(51) Int. Cl.
H04B 1/12          (2006.01)
H04B 10/50        (2013.01)
H04B 10/60        (2013.01)

(52) U.S. Cl.
CPC ............. H04B 1/12 (2013.01); H04B 10/503 (2013.01); H04B 10/60 (2013.01); *H04B 2210/006* (2013.01)

(58) Field of Classification Search
None
See application file for complete search history.

(56) References Cited

U.S. PATENT DOCUMENTS

| | | | |
|---|---|---|---|
| 7,558,479 B1 * | 7/2009 | Robinson ........... | H04B 10/2543 398/16 |
| 10,727,945 B1 | 7/2020 | Nguyen et al. | |
| 11,309,965 B2 | 4/2022 | Nguyen et al. | |
| 2010/0196017 A1 * | 8/2010 | Tanimura ........... | H04B 10/6161 398/208 |
| 2011/0008059 A1 * | 1/2011 | Chang .................... | H04B 10/60 398/202 |
| 2011/0243490 A1 * | 10/2011 | Ryf .................... | G02B 6/29311 385/28 |
| 2012/0177384 A1 * | 7/2012 | Ryf .................... | H04B 10/2581 385/24 |

* cited by examiner

*Primary Examiner* — Darren E Wolf
(74) *Attorney, Agent, or Firm* — Fenwick & West LLP

(57)          ABSTRACT

A programmable filter for electronic signals. The filter includes an input that splits power of the input signal along two paths, a first and second path that is phase shifted by ninety degrees in respect of the first path. The first and second path are each modulated to the optical domain, and provided as input to respective filter chains. The in-phase signal can be filtered by IIR or FIR optical filters with configurable operation, as well the shifted signal can be filtered by a second chain of IIR and FIR optical filters with configurable operation. Resulting output from each filter chain is recombined and demodulated from the optical domain. In this manner, the electronic filter can adopt any suitable impulse response, including impulse responses described with complex coefficients. Real parts can be configured by operation of the first filter chain and imaginary parts by operation of the second filter chain.

20 Claims, 8 Drawing Sheets

400

300

500a

600

| CONVERT TO OPTICAL DOMAIN SIGNAL | ∼602 |

| IQ DEMODULATE | ∼604 |

| FILTER EACH DEMODULATED SIGNAL WITH OPTICAL IIR FILTER(S) AND/OR FIR FILTER(S) EACH HAVING SELECTED PARAMETERS | ∼606 |

| COMBINE FILTERED *I* AND *Q* SIGNALS AND CONVERT TO FILTERED SIGNAL | ∼608 |

FIELD PROGRAMMABLE OPTICAL FILTER

CROSS-REFERENCE TO RELATED APPLICATION(S)

This application is a nonprovisional of, and claims the benefit under 35 U.S.C. 119(e) to U.S. Provisional Patent Application No. 63/416,742, filed Oct. 17, 2022, and entitled "Incoherent Programmable Microwave Photonic Filter with Complex Coefficients," the contents of which are incorporated herein by reference as if fully disclosed herein.

TECHNICAL FIELD

Embodiments described herein relate to integrated photonic systems, and in particular, to programmable optical filters that can be leveraged for any signal filtering purpose, including but not limited to communications systems, ranging systems, warfare systems, signal processing, beamforming systems, sensing systems, imaging systems, and the like.

BACKGROUND

Wireless communication devices can include a transmitter and a receiver configured for simultaneous operation. In many environments, reflection(s) of transmitted signals become incident upon a receiver, interfering with receiver operation. Some modern wireless communication devices incorporate a self-interference cancellation subsystem that feeds transmitter chain signals into a programmable filter (or filter chain) that is configured to approximate, either in baseband or in RF, an inverse of a transfer function representing these environmental reflection effects.

However, semiconductor-based RF domain programmable filters for self interference cancellation and other wireless communications purposes have limited bandwidth, high power requirements, large size, and limited performance. Other solutions leverage RF to optical domain conversion techniques (so as to employ optical filters) and often require coherent laser light sources, multi-wavelength laser light sources, one or more wavelength division multiplexing and demultiplexing stages, among other temperature-sensitive, high cost, low efficiency, high insertion loss, and high power consumption components and modules. Such systems are often not suitable for application outside of tightly controlled lab conditions, such as those applications requiring low manufacturing cost, small form factor, and/or low power consumption.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
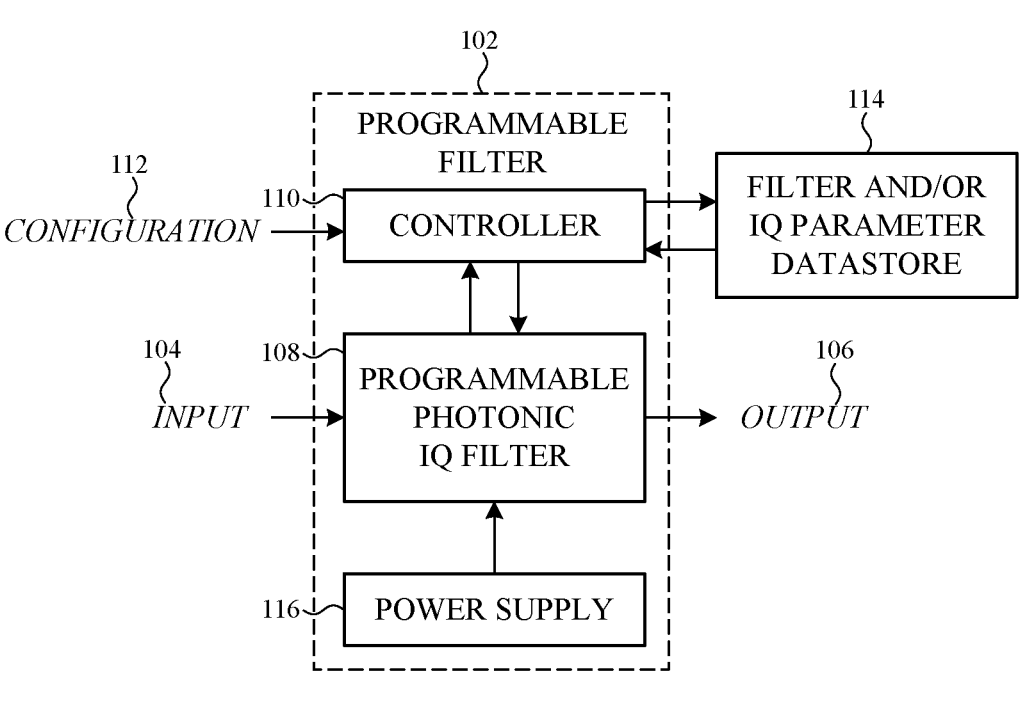
FIG. 1 depicts a programmable filter, such as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems and methods for filtering electrical signals. The input electrical signal can be any suitable signal and may include frequency content and/or may be a baseband signal modulated to an intermediate frequency or carrier frequency centered within any band of the EM spectrum below optical frequencies. Example electrical signals that can be filtered by methods and systems described herein include digital baseband signals, sensor signals, radio frequency band modulated signals, microwave band modulated signals, mmWave band modulated signals, and the like. For simplicity of description, many example embodiments are discussed herein in view of applications in which an RF signal is filtered, but it is appreciated that this is merely one example signal. Broadly, embodiments described herein relate to systems and methods of filtering signals through the use of photonic circuits and systems. More generally, an input RF signal can be used to modulate output of an optical transmitter, which may include one or more laser diodes or other laser light sources. The laser light sources can be externally modulated or modulated by operation of a photonic structure such as a Mach-Zehdner modulator; many constructions are possible.

Output of the optical transmitter can be passed through one or more optical filtering stages before being provided as input to a photosensitive area (also referred to an "aperture") of an optical receiver, which may include one or more photodiodes. Output of the optical receiver includes RF frequency content corresponding to a filtered expression of the input RF signal.

Broadly, embodiments described herein receive an RF signal as input, convert that signal to an optical signal, filter the optical signal, and convert the filtered optical signal back to RF as an RF output signal. As may be appreciated multiple preceding and/or subsequent filters can be included in various implementations, but for simplicity of description the embodiments that follow reference a filter that may be used as an element of a larger system or another RF chain.

A filter as described herein can be configured with any suitable transfer function. For example, in some embodiments, a filter as described herein can be high pass filter, a low pass filter, or a band pass filter. In many embodiments, a filter as described herein is configured with an implementation-specific transfer function, such as one that approximates the inverse of a transfer function of a particular RF environment.

In these examples, the filter can serve as a portion of a self-interference cancellation subsystem of a wireless communications device that includes a transmitter and a receiver. This example application of the systems and methods described herein is not limiting, and other implementations are contemplated herein, but nevertheless for simplicity of description the embodiments that follow reference an implementation in which a filter as described herein is levered by a wireless communications system for a self-interference cancellation purpose.

As noted above, a filter as described herein receives an input RF signal and provides a filtered RF signal as output. For embodiments described herein, the input RF signal can initially be provided as input to a power splitter (which may be a hybrid RF splitter) configured to provide as output, two signals of equivalent power. One of the output signals is phase shifted by ninety degrees, or pi radians. In some cases, the phase shift can be imparted by increasing path length of one of the respective output paths of the power splitter. In other cases, phase shift can be imparted in any other suitable way. In some embodiments, the phase shift may be relative to a carrier frequency or center frequency of the input RF signal. In other cases, a wideband phase shifter can provide a fixed phase shift for a wide range of frequencies.

The divided RF signals may be referred to as an in-phase signal or an "I" signal and a quarter phase-shifted signal or a "Q" signal. The I and Q signals can each thereafter be provided, as input, to respective optical transmitter structures for modulation to an optical carrier. Each optical filtering path can include one or more infinite impulse response ("IIR") optical filters and/or one or more finite impulse response ("FIR") filters. In some cases, IIR filters may not be required. Filter chains can be constructed in a number of different ways and, likewise, FIR and IIR filter blocks can be coupled together in a number of suitable ways. As an example, FIR and IIR filter blocks can be coupled in series or shunt.

If included for a particular application, the IIR filters may be photonic elements such as Mach-Zehner interferometers, resonators, delay lines, filters, Bragg gratings and the like. As known by a person of skill in the art, combinations, cascades, and chains of such photonic elements can provide arbitrary filtering effects and can be electrically controllable.

The FIR filters may include photonic elements such as power splitters, reflectors, polarity switches, and/or delay lines and can, like the IIR filters, be electrically controllable.

To ensure phase offset consistency through both the I filter chain and the Q filter chain, all delay blocks, IIRs, and FIRs are typically constructed to be as identical as practicable. In some cases, a calibration or equalization block or series of blocks may be included including tunable delay elements (or similar components) to adjust path differences and phase and amplitude imbalances between the I filter chain and the Q filter chain. In some cases, calibration blocks can be distributed throughout either or both filter chains. As such, embodiments described herein may be implemented in integrated photonic platforms.

In this manner, more generally and broadly, the optical I signal can be filtered in an arbitrary manner by control of parameters defining operation of a first chain of IIR and FIR filters. Similarly, the optical Q signal can be filtered in an arbitrary manner by control of different parameters defining operation of a second chain of IIR and FIR filters.

Thereafter, output from each of the filtered optical I signal and the filtered optical Q signal can be combined, either in the optical domain or after having been demodulated to the RF domain (e.g., by operation of a photodiode, balanced photodiode pair, or other differential optical to RF domain conversion structure).

As a result of this foregoing described RF-optical-RF construction, the input RF signal can be filtered in an arbitrary manner to generate an output RF signal. In many embodiments, the filter may be programmed to invert a transfer function of a local RF environment. The filter can be used, in some examples, to reduce multipath effects in a receive signal and increase signal to noise ratio. In other cases, the filter can be used to generate a self-interference cancellation signal from a transmitted RF signal. The output of the filter can be combined with received signals so as to subtract echoes of the transmit signal from those receive signals. Many possible uses are possible.

More generally, a filter as described herein can be configured to have any suitable impulse response to input. In this manner, a filter as described herein can be referred to as a "programmable" filter, as both inputs and outputs of the filter are in the RF domain. Further, as may be appreciated by a person of skill in the art, configurations of a programmable filter as described herein can be represented and/or modeled by a difference equation defined by a set of coefficients, each of which may be complex numbers that include both real and imaginary parts. Specifically, embodiments described herein support complex coefficient applications by separately controlling parameters of the respective IIRs and FIRs that each respectively modify the optical I signal and the optical Q signals. More simply, filters described herein generate real and imaginary portions of a complex filter coefficient separately, and thereafter combine the separately generated portions of each respective coefficient at an aperture of an optical receiver.

By contrast, conventional programmable filters are typically either only configured to (1) support real coefficients (more specifically, only able to configure as filters having only real coefficients), or (2) generate both imaginary and real portions of complex filter coefficients simultaneously and thus expressly require coherent laser light sources and/or complex multi-wavelength optical transmitters in addition to requisite wavelength multiplexing and demultiplexing subsystems. The first conventional solution is limited in application and bandwidth and the second is bulky, power inefficient (some conventional systems require optical amplifiers in addition), and expensive.

By contrast, filters described herein can be manufactured within integrated platforms and can be suitably incorporated into many electronic devices of many types—including small form factor devices and portable electronic devices.

These foregoing and other embodiments are discussed below with reference to FIGS. 1-6. However, those skilled in the art will readily appreciate that the detailed description given herein with respect to these figures is for explanation only and should not be construed as limiting.

FIG. 1 depicts a system including a programmable filter, such as described herein. As with other embodiments described herein, the system 100 includes a programmable filter 102 configured to receive as input a first signal at an input 104 and to provide as output a second signal at an output 106.

Interposing the input 104 and the output 106 is a programmable photonic IQ filter 108, such as described herein. The programmable photonic IQ filter 108 can be configured to split power of the first signal along two paths, an in-phase path and a quarter-phase shifted path, referred to herein as an "I path" and a "Q path" respectively.

The I path of the programmable photonic IQ filter 108 can include one or more passive and active photonic elements including optical transmitters, optical receivers, optical filters, delay lines, and the like. Example constructions of the programmable photonic IQ filter 108 are provided with reference to FIGS. 2-5C.

In many constructions the programmable photonic IQ filter 108 includes at least one FIR for each of the I path and the Q path. Each respective FIR can include a plurality of delay lines and/or taps each spaced a particular distance from the input 104. Each of these taps can be associated with a respective one power splitter and polarity switch (or filter). In this manner, each tap of the FIR is configured to extract a portion of the input signal at different phases (e.g., delays) relative to $t_0$, at different polarities (e.g., positive or negative), and at different amplitudes to a particular configuration of the FIR filter.

In an example in which the programmable filter 102 is used as a portion of a self-interference cancellation filter of a communication device (wireless or wired), a transmitted signal can be provided as input to the input 104 and each tap of at least one FIR can be configured to counteract a respective one reflection of that transmitted signal that may be incident upon a receiver of the same wireless communication device (and/or a co-located wireless communication device). Each of these delayed, potentially inverted, and attenuated copies of the transmitted signal can be aggregated together in the optical or RF domains to result in a single aggregate cancellation signal that can be combined with received signals to cancel echoes of the transmitted signal that become incident upon the receiver. In many constructions, certain of the taps of the FIR(s) of the programmable photonic IQ filter 108 taps may be disabled and may not contribute to the aggregate cancellation signal. More specifically, some power splitters may be configured to not extract any power from the input signal.

Each component of the FIR(s) can be optionally electronically, optically, or mechanically controllable by a controller 110. For example, the controller 110 can be configured to provide one or more elements with a specific voltage or current to change an optical property thereof. For example, one or more of the FIR components may include a heater element. In these examples, the controller 110 can be configured to provide electrical current to the heater element to cause the heater element to increase in temperature and effect a thermos-optic property of a structure proximate to that heater. In other cases, semiconductor switches (including MEMS switches), circuits, or other structures can be activated, actuated, or otherwise controlled by the controller to introduce one or more changes in a photonic element associated with a portion of an FIR as described herein. In some cases, the controller 110 can be configured to program a state of one or more nonvolatile switches. In these examples, the controller 110 can configure the programmable filter in a single programming operation In this manner, the controller 110 electrically controls polarity, amplitude, and delay of each portion of an aggregate cancellation signal that may be required to cancel self interference. As noted above, however, this example is merely one example and a filter such as the programmable photonic IQ filter 108 can be configured and constructed in a number of suitable ways; in some cases, the controller 110 can configure the programmable photonic IQ filter 108 to operate as a band pass filter, a high pass filter, a low pass filter, an IIR, a FIR, or any other suitable filter.

In many cases, the controller 110 is communicably and/or operably coupled to one or more other electronic circuits from which the controller 110 can receive instructions. For example, the controller 110 can be configured to receive command and control instructions from a configuration parameter input 112. For example, the controller 110 can be communicably coupled to a processor of an electronic device, such as a wireless communication device. The processor can be configured to provide instructions to the controller 110 that cause the controller 110 to change filter parameters of the programmable photonic IQ filter 108. In some cases, the controller 110 can be operably coupled to a datastore, such as the filter parameter datastore 114 from which filter parameters (e.g., coefficients) can be stored. In other cases, filter parameters can be provided to the controller 110 and applied thereby to the programmable photonic IQ filter 108 from the configuration parameter input 112 itself.

These foregoing embodiments depicted in FIG. 1 and the various alternatives thereof and variations thereto are presented, generally, for purposes of explanation, and to facilitate an understanding of various configurations and constructions of a programmable filter, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings. For example, in many constructions the programmable photonic IQ filter 108 can include one or more calibration blocks or modules including photonic and/or semiconductor elements configured to account for fabrication tolerances, IQ imbalances, path length differences, thermal effects, environmental changes and so on.

Figure 2:
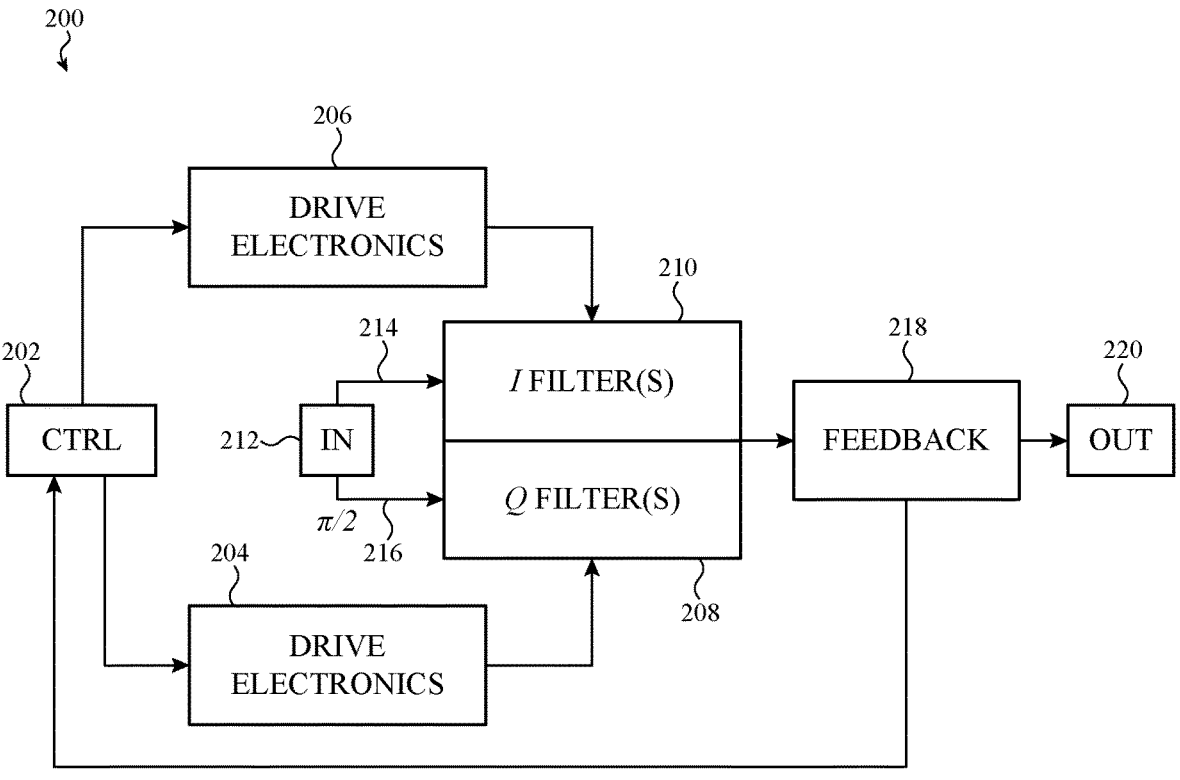
FIG. 2 is a simplified system diagram of a programmable filter, as described herein.

FIG. 2 is a simplified system diagram of a programmable filter, as described herein. As with other embodiments described herein, the programmable filter 200 includes a controller 202 configured to command and control one or more drive electronics (or other driver type) that in turn set operational parameters of one or more optical filter elements, such as FIR elements or IIR elements of an I path or a Q path.

Specifically, the controller 202 can be configured to provide instructions and electrical power to the drive electronics 204 that are configured to provide control over configurable photonic/filter elements of a Q path as described herein. Similarly, the controller 202 can be configured to instructions and electrical power to the drive electronics 206 that are configured to provide control over configurable photonic/filter elements of an I path as described herein.

In particular, the drive electronics 204 can be operably and/or conductively coupled to one or more filter chains associated with a Q path, collectively illustrated in the figure as the Q filter chain 208. Similarly, the drive electronics 206 can be operably and/or conductively coupled to one or more filter chains associated with an I path, collectively illustrated in the figure as the I filter chain 210.

As with other embodiments described herein, the programmable filter 200 is configured to receive an input signal via an input such as the input 212. Preceding the input 212, the input signal may be optionally amplified or prefiltered, in some embodiments. The input 212 can be coupled to a power splitter and/or a hybrid power splitter that divides power of the input between the in-phase path 214) and the quarter-shifted path 216. The power splitter may be implemented as a semiconductor or RF circuit or may be implemented as a photonic device. As understood by a person of skill in the art, the quarter-shifted path 216 is phase shifted by 90 degrees or one half π radians. More specifically, the quarter-shifted path 216 is delayed relative to the in-phase path 214 by a time period equal to one quarter of the period of the carrier of the input signal. In this manner, the in-phase path 214 and the quarter-shifted path 216 may be time shifted by different amounts for different input signals at different carrier frequencies. In these embodiments the controller 202 can be configured to adjust an operational parameter of the power splitter so as to accommodate a consistent phase shift in respect of different carriers.

In this construction, the in-phase path 214 provides input to the I filter chain 210 and the quarter-shifted path 216 provides input to the Q filter chain 208, each of which may be configured dynamically in the field by the controller 202. The I filter chain 210 and the Q filter chain 208 can each include an optical transmitter, a series of FIR and/or IIR filters, and an optical receiver. As noted with respect to other embodiments described herein, the optical transmitter(s) can include at least one laser whose output can be modulated in respect of the signal provided at the input 212. The FIR filters and/or IIR filters of the I filter chain 210 and the Q filter chain 208 can each be controlled, at least in part, by the drive electronics 204 and the drive electronics 206. Once each of the I and Q paths are filtered, outputs thereof can be optically combined and provided as input to a photodiode or other optical receiver device. In some cases, each of the I path and the Q path terminate with a respective dedicated optical receiver. In these examples, output of each respective optical receiver can be combined by an RF combiner. These examples are not exhaustive; a person of skill in the art may readily appreciated that many systems and methods for converting two optical signals to signals are possible.

Output of the I filter chain 210 and the Q filter chain 208 are combined and may be received at a feedback sampling subsystem 218 that can provide feedback to the controller 202 so that the controller 202 can adjust control of the drive electronics 206 and/or the drive electronics 204 to change operation of the I filter chain 210 and/or the Q filter chain 208. In some embodiments, the feedback sampling subsystem 218 is optional and may not be required.

Independent of whether the feedback sampling subsystem 218 is provided in a particular application, combined output of the I filter chain 210 and the Q filter chain 208 can be provided as an output via the output 220.

The foregoing embodiment depicted in FIG. 2 and the various alternatives thereof and variations thereto are presented, generally, for purposes of explanation, and to facilitate an understanding of various configurations and constructions of a programmable filter, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 3:
FIG. 3 is a system diagram of a programmable filter supporting real and complex coefficients, as described herein.
Figure 3:
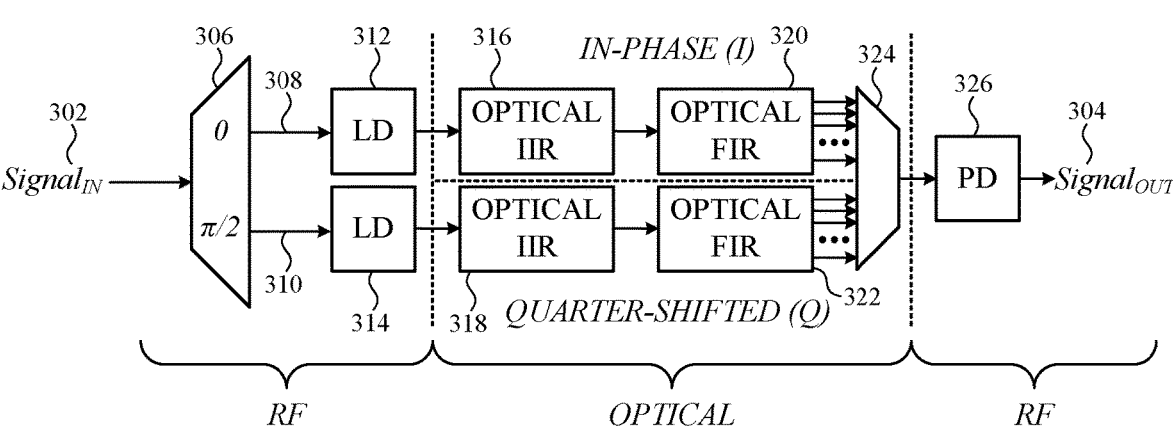

FIG. 3 is a system diagram of a programmable filter supporting real and complex coefficients, as described herein. In this example, the programmable filter 300 receives an input signal 302 and provides, as output, an output signal 304. As with other embodiments described herein, the output signal 304 may be a filtered expression of the input signal 302. For example, the output signal 304 may be low-pass filtered expression of the input signal 302. In other cases, the output signal 304 may be a high-pass filtered expression of the input signal 302. In many embodiments, however, the transfer function of the programmable filter 300 is application-specific, such as an approximation of an inverse of a transfer function of a local RF environment into which a wireless communication device incorporating the programmable filter 300.

The input signal 302 can be split along two paths of equal power by a power splitter, such as the power splitter 306. The power splitter 306 is configured to provide a first output, the in-phase path 308. The power splitter 306 is further configured to provide a second output, the quarter-shifted path 310 that remains a quarter phase out of phase with the in-phase path 308. As noted above, the phase shift of the first path and the second path may be defined in respect of a carrier frequency of the input signal 302 or in some examples, the phase shift can be in respect of a wide band of frequencies.

The in-phase path 308 can be provided as input to an optical transmitter 312. The optical transmitter 312 can include one or more laser diodes that are configured to modulate output based on a signal provided as input thereto. For example, in some cases, a laser diode may be amplitude modulated based on amplitude of an input signal. In other cases, a laser diode may be frequency modulated based on amplitude or frequency of an input signal. In any construction, the optical transmitter 312 is configured to provide, as output, an optical signal that varies in some manner directly related to time variability of the input signal, in this case, a signal traversing the in-phase path 308.

Likewise, the quarter-shifted path 310 can be provided as input to an optical transmitter 314 that is also configured to provide a modulated laser light output in response to an input signal.

In some cases, laser output of the optical transmitter 314 and laser output of the optical transmitter 312 may be coherent, but this is not required. In typical applications, the optical transmitter 314 and the optical transmitter 312 may be formed and/or disposed onto a common substrate and/or formed in common process so as to exhibit substantially identical output but this is not required of all embodiments. In many embodiments, the optical transmitter 312 and the optical transmitter 314 may be positioned proximate to one another so that laser diodes can be thermally coupled and/or otherwise exposed to substantially the same thermal environment.

In many cases, the optical transmitter 312 and the optical transmitter 314 may be configured to self-regulate and/or self-calibrate based on one or more environmental conditions, such as temperature. Many possible considerations and calibrations are possible.

Once light is emitted from the optical transmitter 312 and the optical transmitter 314, the input signal 302 is modulated to the optical domain from the RF domain. As a result, a series of optical filtering elements, either configurable or static, can be used. In particular, in many embodiments, output of the optical transmitter 312 can be provided as input (e.g., via a wire bond, fiber optic cable, waveguide, free space, or other light conveyance structure or medium) to optical IIR filter chain 316. As an example, the optical IIR filter chain 316 can include a resonator or other photonic structure or element.

Likewise, the Q path can include an optical IIR filter chain 318 that receives optical output of the optical transmitter 314.

As noted above, construction and structure of the optical IIR filter chain 316 and optical IIR filter chain 318 may be substantially identical. In many cases, the optical IIR filter chain 316 and the optical IIR filter chain 318 are defined by integrated photonic components. In many cases, semiconductor control structures (e.g., heaters) can be formed with and/or on the same substrates as the optical IIR filter chain 316 and the optical IIR filter chain 318.

Output of the optical IIR filter chain 316 and the optical IIR filter chain 318 can each be provided, respectively, as input to an optical FIR chain 320 and an optical FIR chain 322. Each of these chains can include a set of taps, each associated with a respective delay, a respective electrically-controllable power splitter, and optionally an electrically controllable polarity divider/switch (which can include MEMS and nonvolatile switches). As a result of these constructions, each respective FIR chain can be electrically controlled to implement application-specific filtering properties.

Output of the various taps associated with each of the optical FIR chain 320 and the optical FIR chain 322 can be combined together by an optical multitap combiner, such as described in U.S. Pat. Nos. 11,309,965 and 10,727,945 both to Nguyen et al., each of which is incorporated by reference as is full disclosed herein. In FIG. 3, the multitap combiner is depicted as the multi-tap optical combiner 324, and is configured to output a single optical signal to be received as input at an optical receiver 326.

The optical receiver 326 can include one or more photodiodes or balanced photodiodes or other structure configured to convert an optical signal into an electrical signal. Output of the optical receiver 326 is an electrical signal with RF content that serves as a filtered expression of the input signal 302. As noted above, this architecture enables the quarter-shifted path 310 and the in-phase path 308 to separately implement real coefficients and imaginary coefficients deriving the overall transfer function of the programmable filter 300.

Figure 4:
FIG. 4 is a system diagram of another programmable filter supporting real and complex coefficients, as described herein.
Figure 4:
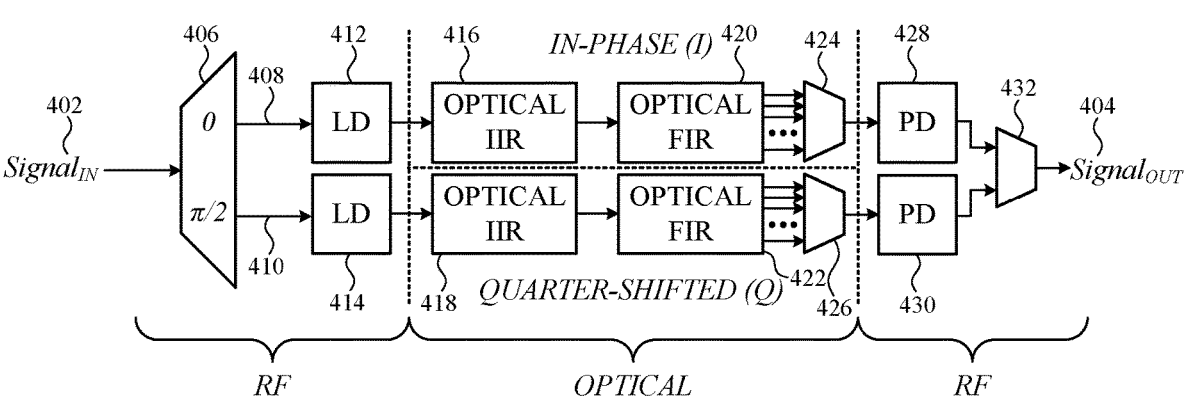

In other examples, a programmable filter can be architected in a different manner. For example, FIG. 4 is a system diagram of a programmable filter supporting real and complex coefficients, as described herein. In this example, as with the embodiment shown and described in respect of FIG. 3, the programmable filter 400 receives an input signal 402 and provides, as output, an output signal 404.

As with other embodiments described herein, the output signal 404 may be a filtered expression of the input signal 402. For example, the output signal 404 may be low-pass, band-pass, notch or high pass filtered expression of the input signal 402. As noted above, in many examples, the transfer function of the programmable filter 400 is application-specific, such as an approximation of an inverse of a transfer function of a local RF environment into which a wireless communication device incorporating the programmable filter 400. Such filter configurations are useful for self-interference cancellation in small form factor devices.

As with other embodiments described herein, the input signal 402 can be split along two paths of equal power by a power splitter, such as the power splitter 406. In many embodiments, the power splitter 406 is a hybrid power splitter, but this is not required.

As with the embodiment described above in respect of FIG. 3, the power splitter 406 is configured to provide a first output, the in-phase path 408, that remains in phase with the input signal 402 itself. The power splitter 406 is further configured to provide a second output, the quarter-shifted path 410 that remains a quarter phase out of phase with the in-phase path 408.

The in-phase path 408 is provided as input to an optical transmitter 412. The optical transmitter 412 can include one or more laser diodes that are configured to modulate output based on a signal provided as input. The optical transmitter 412 can be an externally modulated laser or a laser modulated by a modulation structure, such as a Mach Zehnder Modulator. For example, in some cases, a laser diode may be amplitude modulated based on amplitude of an input signal. In other cases, a laser diode may be frequency modulated based on amplitude or frequency of an input signal. In any construction, the optical transmitter 412 is configured to provide, as output, an optical signal that varies in some manner directly related to time variability of the input signal, in this case, a signal traversing the in-phase path 408. Likewise, the quarter-shifted path 410 can be provided as input to an optical transmitter 414 that is also configured to provide a modulated laser light output in response to an input signal.

Once light is emitted from the optical transmitter 412 and the optical transmitter 414, the input signal 402 is modulated to the optical domain from the RF domain. As a result, a series of optical filtering elements, either configurable or static, can be used. In particular, in many embodiments, output of the optical transmitter 412 can be provided as input (e.g., via a wire bond, fiber optic cable, waveguide, free space, or other light conveyance structure or medium) to optical IIR filter chain 416. Likewise, the Q path can include an optical IIR filter chain 418 that receives optical output of the optical transmitter 414. The optical IIR filter chain 416 and the optical IIR filter chain 418 can include one or more elements that are electrically controllable, such as by a controller as described in respect of FIGS. 1-2.

Construction and structure of the optical IIR filter chain 416 and optical IIR filter chain 418 may be substantially identical. In many cases, the optical IIR filter chain 416 and the optical IIR filter chain 418 are formed with integrated photonic components. In many cases, semiconductor control structures can be formed with and/or on the same substrates as the optical IIR filter chain 416 and the optical IIR filter chain 418.

Output of the optical IIR filter chain 416 and the optical IIR filter chain 418 can each be provided respectively as input to an optical FIR chain 420 and an optical FIR chain 422. Each of these chains can include a set of taps, each associated with a respective delay, a respective electrically-controllable power splitter, and optionally an electrically controllable polarity divider/switch. As a result of these constructions, each respective FIR chain can be electrically controlled to implement application-specific finite impulse response filtering properties.

Output of the various taps associated with each of the optical FIR chain 420 and the optical FIR chain 422 can be combined together by dedicated optical multi-tap combiners, such as the multi-tap optical combiner 424 and the multi-tap optical combiner 426. Out put of these combiners can be provided as input to dedicated optical receivers, namely the optical receiver 428 and the optical receiver 430.

As with other embodiments described herein, the optical receiver 428 and the optical receiver 430 can each include one or more photodiodes to convert optical signals filtered in the in-phase path 408 or filtered in the quarter-shifted path 410 into signals. Thereafter, the respective outputs of the optical receiver 428 and the optical receiver 430 can be combined by an RF combiner 432 before being provided as the output signal 404.

These foregoing embodiments depicted in FIGS. 3-4 and the various alternatives thereof and variations thereto are presented, generally, for purposes of explanation, and to facilitate an understanding of various configurations and constructions of a programmable filter, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, in some embodiments, a power splitter receiving an input signal may be a hybrid power splitter. This power splitter can be paired with a standard combiner at the output of a programmable filter or, in other cases, a hybrid combiner may be used. Many constructions are possible.

Figure 5A:
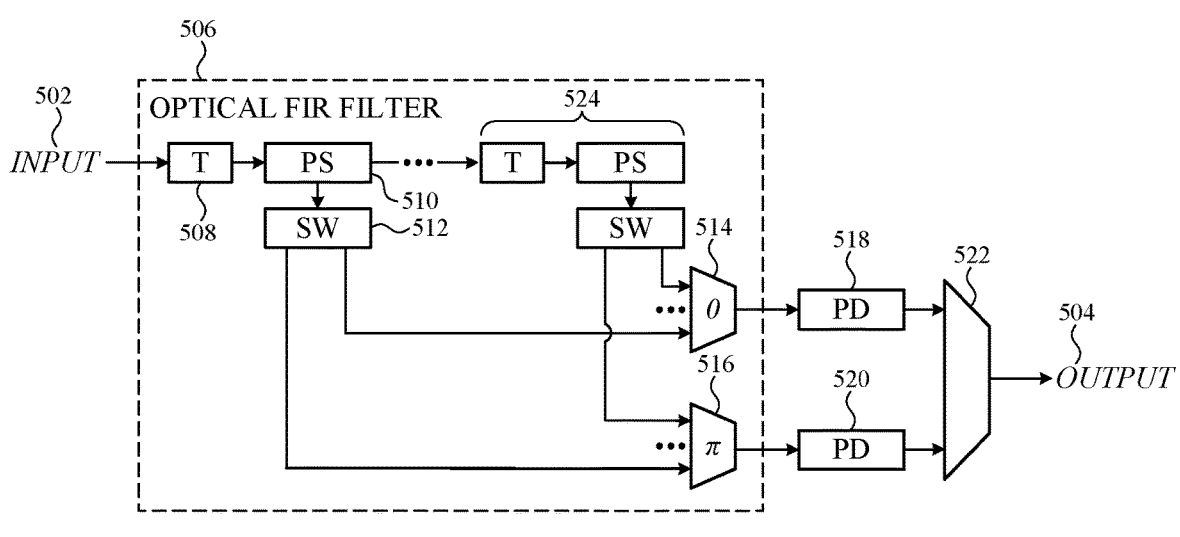
FIGS. 5A-5C each depict a simplified schematic diagram of a programmable finite impulse response filter as described herein.
Figure 5B:
Figure 5B:
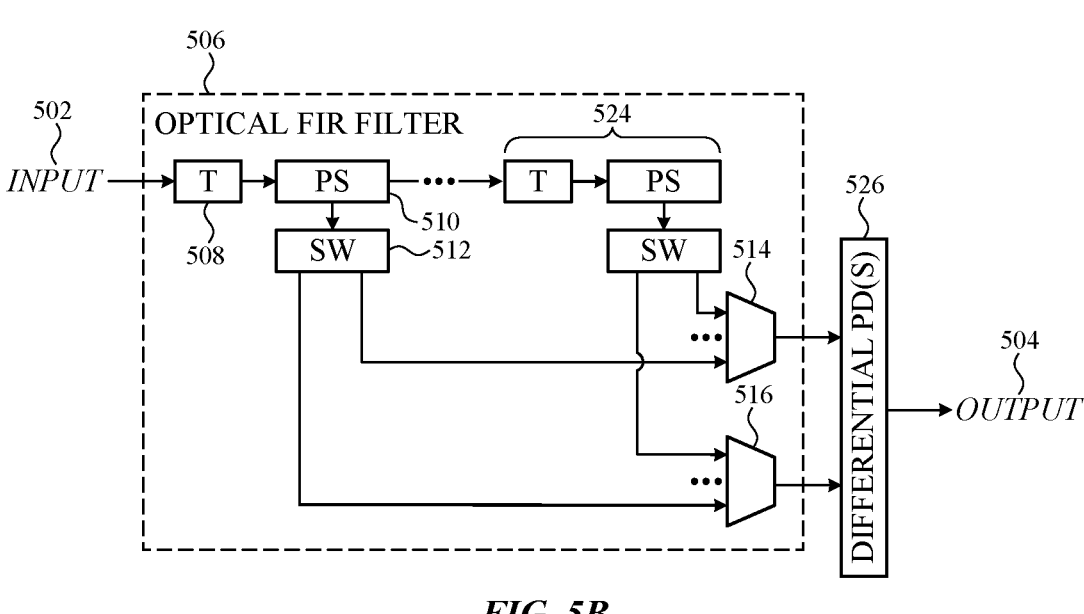
Figure 5C:
Figure 5C:
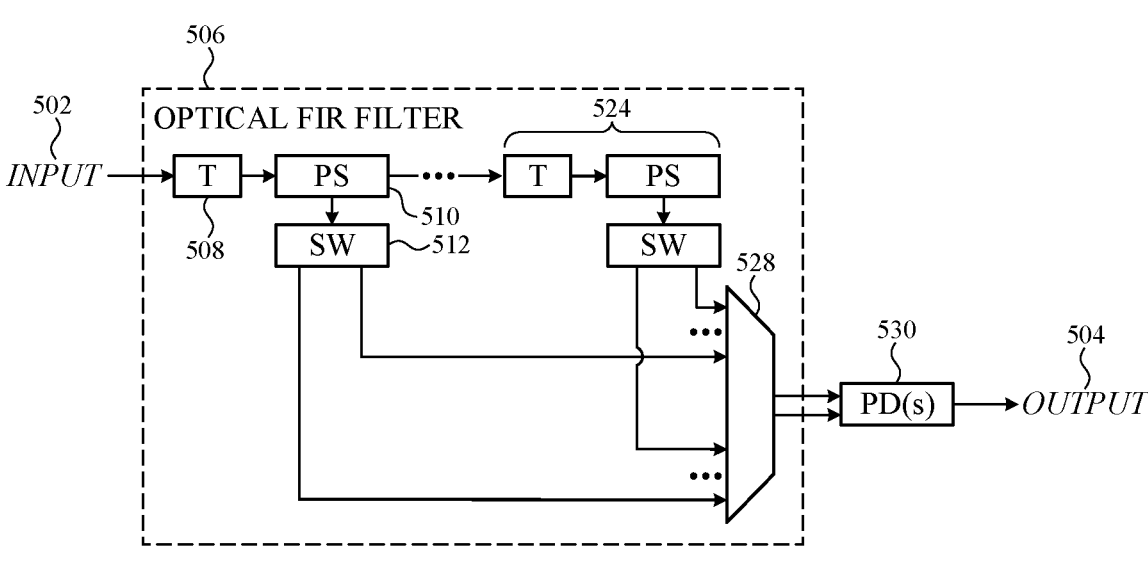

FIGS. 5A-5C each depict a simplified schematic diagram of a programmable finite impulse response filter as described herein. These embodiments depict the optical to filter chain 500a, the optical to filter chain 500b, and the optical to filter chain 500c each of which include an optical input 502. The optical input may be an optical transmitter as described above, or may in some examples, be an output of an IIR filter of either an I path or a Q path as described above.

The optical input 502 of each depicted embodiment is converted to an output signal 504 by operation of an optical FIR filter 506. Each optical filter can include a plurality of taps or delay lines, each of which correspond broadly to a discrete time sample (e.g., z(n), z(n−1), z(n−2) and so on, in terms of a Z transform of the impulse response of the optical FIR filter 506) of the optical input 502. An example tap is provided as the tap 508.

Each tap can be selectively activated by a respective power splitter, such as the power splitter 510. The power splitter 510 can be an electrically controllable element that extracts a configurable portion of optical power at each respective tap. Output of the power splitter 510 can be directed to a polarity switch 512 that provides two outputs—a first output in phase with the input signal, the optical input 502, and a second output that is 180 degrees or 7L radians out of phase with that same signal. In this manner, the polarity switch 512 can be used to select whether a particular tapped signal at a particular amplitude (determined by an operational configuration of the power splitter 510) has positive or negative amplitude. As with the power splitter 510, output of the polarity switch 512 can be electrically controlled such that, in some examples, only one polarity provided as output at a time.

Finally, each (nonzero) output of the polarity switch 512 can be provided as input to one or more optical multi-tap combiners. For example, FIG. 5A depicts in-phase signals being provided as input to a first polarity combiner 514 and out-of-phase signals being provided as input to a second polarity combiner 516, each of which can feed a respective one optical receiver, such as the optical receiver 518 or the optical receiver 520. Output of each of these receivers can be provided as input to an RF combiner, which in turn can generate a combined output as the output signal 504.

By contrast, FIG. 5B depicts a configuration in which output of the first polarity combiner 514 and the second polarity combiner 516 are provided as input to a differential photodiode optical receiver, the differential optical receiver 526. Output from this differential measurement system can be provided as the output signal 504.

In yet another construction, such as shown in FIG. 5C, a single multi-segment multi-tap optical combiner can be used, identified in the figure as the multi-tap combiner 528. Outputs from this combiner can each be provided as input to a differential photodiode pair or differential optical receiver of another suitable construction, identified in FIG. 5C as the differential optical receiver 530. Output of this receiver can be provided as the output signal 504.

These foregoing embodiments depicted in FIGS. 5A-5C and the various alternatives thereof and variations thereto are presented, generally, for purposes of explanation, and to facilitate an understanding of various configurations and constructions of a programmable filter, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, it may be appreciated that an input signal can be split in a number of ways and, likewise, a split-path optical system can be recombined in a number of suitable ways. For example, multiple optical signals (e.g., an I-path and a Q path) can be combined by an optical combiner or may be converted to the RF domain before being combined by an RF combiner or hybrid RF combiner. Many suitable filtering chains are possible in view of the teachings provided herein.

Figure 6:
FIG. 6 is a flowchart depicting example operations of a method of operating a programmable filter, as described herein.
Figure 6:
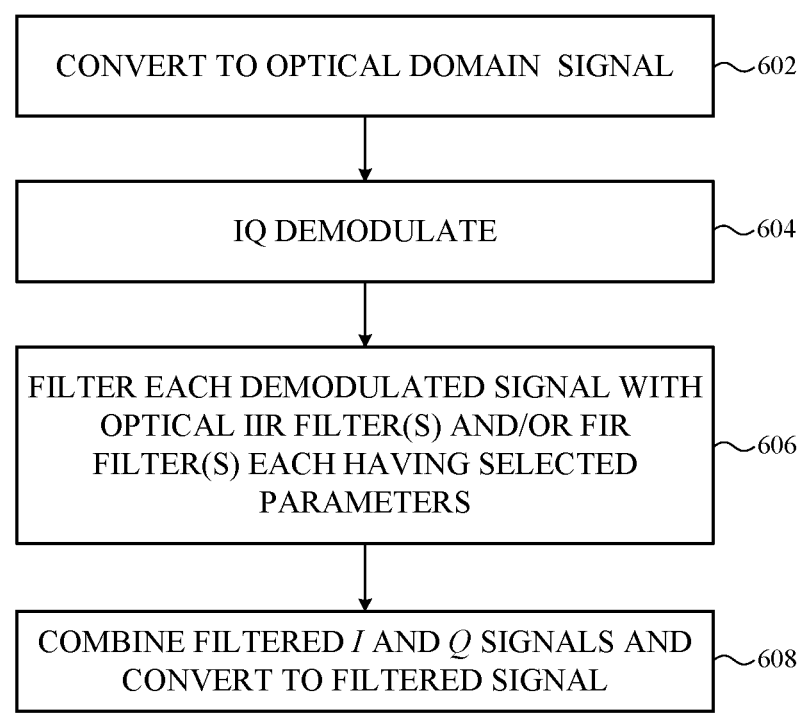

Generally and broadly, the embodiments described herein can be considered in respect of a method of providing filtering for a signal. FIG. 6 is a flowchart depicting example operations of a method of operating a programmable filter, as described herein. The method 600 includes operation 602 at which an input signal is converted to the optical domain by a suitable structure or system. The method 600 also includes operation 604 at which an IQ demodulation operation can be performed, effectively splitting the input signal along an in-phase path and along a quarter-phase shifted path. Thereafter, at operation 606, each path output by the IQ demodulator can be separately filtered according to set parameters controlled by a controller (see, e.g., FIG. 2). In many cases, the I-path configuration corresponds to the real parts of coefficients of a difference function that describe a transfer function or impulse function of the filter's target behavior. Similarly, the Q-path configuration corresponds to the complex parts of coeffects of the same difference equation. Finally, at operation 608, the two separately filtered signals can be recombined into a single, filtered, signal that can be provided as output.

These foregoing embodiments depicted in FIGS. 1-6 and the various alternatives thereof and variations thereto are presented, generally, for purposes of explanation, and to facilitate an understanding of various configurations and constructions of a filter, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

As noted above, a signal generator and/or photonic circuit or optical circuit such as described herein can be incorporated into any suitable computing device or computing resource. As used herein, the term "computing resource" (along with other similar terms and phrases, including, but not limited to, "computing device" and "computing network") refers to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive. optical transmitter 312

What is claimed is:

1. A programmable electronic signal filter comprising:
an input to receive an input signal;
a power splitter coupled to the input and configured to split the input signal along:
    a first path; and
    a second path phase shifted by a quarter period in respect of the first path;
a first optical transmitter coupled to the first path and configured to provide as output a first modulated optical output;
a second optical transmitter coupled to the second path and configured to provide as output a second modulated optical output;
a first configurable optical filter chain receiving output of the first optical transmitter;
a second configurable optical filter chain receiving output of the second optical transmitter;
an optical combiner configured to combine output of the first configurable optical filter chain and the second configurable optical filter chain;
an optical receiver coupled to an output of the optical combiner and configured to provide, as output, an output signal; and
a controller configured to:
    set one or more parameters of the first configurable optical filter chain based on real coefficients of a selected impulse response; and
    set one or more parameters of the second configurable optical filter chain based on imaginary coefficients of the selected impulse response.

2. The programmable electronic signal filter of claim 1, wherein the power splitter is a hybrid power splitter.

3. The programmable electronic signal filter of claim 1, wherein the input signal is a microwave signal or an RF signal.

4. The programmable electronic signal filter of claim 1, wherein the output signal comprises a self-interference cancellation signal in respect of the input signal.

5. The programmable electronic signal filter of claim 1, wherein the first optical transmitter and the second optical transmitter each comprise a laser light source modulated respectively by the input signal traversing the first path and the input signal traversing the second, phase shifted, path.

6. The programmable electronic signal filter of claim 1, wherein the optical receiver comprises a photodiode.

7. The programmable electronic signal filter of claim 1, wherein the optical receiver comprises a first photodiode optically coupled to output of the first configurable optical filter chain and a second photodiode optically coupled to output of the second configurable optical filter chain.

8. The programmable electronic signal filter of claim 7, wherein the optical receiver comprises a combiner configured to combine output of the first photodiode with output of the second photodiode to generate the output signal.

9. The programmable electronic signal filter of claim 1, wherein the first configurable optical filter chain comprises an infinite impulse response section and a finite impulse response section.

10. The programmable electronic signal filter of claim 9, wherein the infinite impulse response section comprises an optical resonator.

11. The programmable electronic signal filter of claim 9, wherein the finite impulse response section comprises a tap, a second power splitter, and a polarity switch.

12. A programmable filter comprising:

a first configurable optical filter chain receiving an optical input signal;

a second configurable optical filter chain receiving the optical input signal, phase shifted by ninety degrees;

an optical combiner configured to combine output of the first configurable optical filter chain and the second configurable optical filter chain;

an optical receiver coupled to an output of the optical combiner and configured to provide an output signal; and a controller configured to:

receive a configuration input comprising an impulse response for the programmable filter to implement;

set parameters of the first configurable optical filter chain based on real coefficients of the impulse response; and set parameters of the second configurable optical filter chain based on imaginary coefficients of the impulse response.

13. The programmable filter of claim 12, wherein the controller is operably coupled to a database storing parameters associated with a set of selectable impulse responses.

14. The programmable filter of claim 12, wherein the controller is operably coupled to a database storing the real coefficients and the imaginary coefficients.

15. The programmable filter of claim 12, wherein the controller and the first configurable optical filter chain and the second configurable optical filter chain are integrated.

16. A method of filtering an electronic signal, the method comprising:

receiving as input the electronic signal;

splitting the electronic signal along a first path and a second path as a first path signal and a second path signal, respectively, the second path signal being phase-shifted by 90 degrees in respect of the first path;

independently modulating the first path signal and the second path signal to a first optical signal and a second optical signal, respectively, the second optical signal being 90 degrees out of phase in respect of the first optical signal;

filtering the first optical signal through a first configurable optical filter chain configured based on real parts of complex coefficients defining an impulse response;

filtering the second optical signal through a second configurable optical filter chain configured based on imaginary parts of complex coefficients defining the impulse response;

combining the filtered first optical signal with the filtered second optical signal; and demodulating the combined optical signals to an output electronic signal.

17. The method of claim 16, wherein the electronic signal comprises RF or microwave band content.

18. The method of claim 16, wherein modulating the first path signal to the first optical signal comprises modulating output of a laser diode based on the first path signal.

19. The method of claim 16, wherein the first configurable optical filter chain comprises an infinite impulse response optical filter and a finite impulse response optical filter.

20. The method of claim 16, wherein the impulse response is selected from a database storing a set of impulse responses.

* * * * *